(12) United States Patent
Kordun

(10) Patent No.: US 9,377,942 B2
(45) Date of Patent: *Jun. 28, 2016

(54) DRAG AND DROP QUOTING MECHANISM FOR USE WITH DISCUSSION FORUMS

(71) Applicant: International Business Machines Corporation, Armonk, NY (US)

(72) Inventor: Alexander Kordun, Arlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/143,431

(22) Filed: Dec. 30, 2013

(65) Prior Publication Data

US 2014/0115494 A1    Apr. 24, 2014

Related U.S. Application Data

(63) Continuation of application No. 11/426,105, filed on Jun. 23, 2006, now Pat. No. 8,645,852.

(51) Int. Cl.
*G06F 3/00* (2006.01)
*G06F 3/0486* (2013.01)
*G06Q 10/10* (2012.01)

(52) U.S. Cl.
CPC .............. *G06F 3/0486* (2013.01); *G06Q 10/10* (2013.01)

(58) Field of Classification Search
CPC ........... G06F 3/14; G06F 15/16; G06F 17/21; G06F 3/00
See application file for complete search history.

(56) References Cited

U.S. PATENT DOCUMENTS

| 5,977,972 | A | 11/1999 | Bates et al. |
|---|---|---|---|
| 6,710,788 | B1 | 3/2004 | Freach et al. |
| 7,234,117 | B2 | 6/2007 | Zaner et al. |
| 2002/0196271 | A1 | 12/2002 | Windl et al. |
| 2003/0088830 | A1 | 5/2003 | Tognazzini |
| 2003/0217123 | A1 | 11/2003 | Anderson et al. |
| 2004/0001094 | A1 | 1/2004 | Unnewehr et al. |
| 2004/0111467 | A1 | 6/2004 | Willis |
| 2005/0154993 | A1 | 7/2005 | Chen et al. |

(Continued)

FOREIGN PATENT DOCUMENTS

| JP | 09200350 | 7/1997 |
|---|---|---|
| WO | 9630890 | 10/1996 |
| WO | 03056444 A1 | 10/2003 |

OTHER PUBLICATIONS

"Translucent Windows: Dragging an Image Without Obscuring the Desktop," IBM Technical Disclosure Bulletin, pp. 15-16, Oct. 1994, 1 pg.

Berners-Lee et al., "The World-Wide Web," Communications of the ACM, vol. 37, No. 8, pp. 76-82, Aug. 1994.

(Continued)

*Primary Examiner* — Rashawn Tillery
(74) *Attorney, Agent, or Firm* — Cuenot, Forsythe & Kim, LLC

(57) ABSTRACT

A method of quoting content from a post in a discussion forum can include selecting content within a source post of the discussion forum and performing a drag operation. A representation of the selected content can be dragged in coordination with motion of an onscreen pointer. The method further can include inserting the selected content within an open reply form in the discussion forum upon termination of the drag operation.

20 Claims, 7 Drawing Sheets

(56) References Cited

U.S. PATENT DOCUMENTS

| | | |
|---|---|---|
| 2005/0204305 A1 | 9/2005 | Keely et al. |
| 2006/0090137 A1 | 4/2006 | Cheng et al. |
| 2007/0113194 A1 | 5/2007 | Bales et al. |
| 2007/0208611 A1 | 9/2007 | Collison et al. |

OTHER PUBLICATIONS

Coombs et al., "Markup Systems and the Future of Scholarly Text Processing," Communications of the ACM, vol. 30, No. 11, pp. 933-947, Nov. 1987.

Ito et al., "A Visual Environment for Dynamic Web Application Composition," ACM, Aug. 26-30, 2003.

DRAG AND DROP QUOTING MECHANISM FOR USE WITH DISCUSSION FORUMS

CROSS-REFERENCE TO RELATED APPLICATIONS

This application is a Continuation of U.S. application Ser. No. 11/426,105, filed on Jun. 23, 2006, the entirety of which is incorporated herein by reference.

BACKGROUND

1. Field of the Invention

The present invention relates to online discussion forums and, more particularly, to quoting material from a source post for use within a reply.

2. Description of the Related Art

An online discussion forum (discussion forum) refers to a virtual meeting place such as a Web page, whether available through a public network, such as the Internet, or a private network, such as an intranet. Within that virtual meeting place, users post messages (posts). Other names for discussion forums can include, but are not limited to, Web forums, message boards, discussion boards, discussion groups, and bulletin boards. In general, users can upload posts to the discussion forum. These posts can be viewed by other users who may respond, in turn, by uploading response posts to the discussion forum. A sequence of posts, beginning with a first post and including all other posts uploaded in response to that initial, or root, post, is referred to as a discussion thread. Users need not be online at the same time to participate in a discussion forum.

When authoring a post in a discussion thread, particularly a reply to a post, it may be useful to quote text from an existing post of the same discussion thread. One way of quoting text from a post is to simply cut and paste the text. The user locates the post that contains the text to be quoted, referred to as the source post, highlights the desired text, copies the text, navigates to an open reply form, places the cursor within the open reply form, and then pastes the text. In this case, the user must manually enter any identifying attribution parameters corresponding to the source post, i.e. author name, etc.

One disadvantage of this manner of quoting is the manual nature of the operation and the time needed to attribute the quoted text to the source post. The user must perform a significant number of actions, i.e. clicks etc., as well as remember identifying information for the source post to properly attribute the quoted text. Otherwise, the user must navigate back to the source post to determine those attributes.

Another disadvantage is loss of context. When the user navigates away from the source post, the view presented within the browser is lost. Context indicating which posts were displayed, including the source post, as well as the text that was selected within the source post is lost. If the attention of the user is diverted during the quoting process, the user may inadvertently copy other material, thereby clearing the quoted material from the computer system clipboard. In that case, since the context is not maintained, the user would have to relocate the source post, select the desired text again, and then continue with the copy operation.

Quote buttons are another mechanism for quoting material from a source post. A quote button can be provided within each post presented in the discussion forum. When a user wishes to reply to a given post, a reply form is opened. The user can navigate to the source post, select the text to be quoted, and then activate the quote button located within the source post. The user then can navigate to an open entry form, where the text from the quoted post, along with information identifying the source of the quoted text, is inserted automatically.

The quote button, while addressing post attribution, does present its own set of disadvantages. One disadvantage is that including a quote button within each post of the discussion forum can have the effect of "polluting" the user interface. This is often seen as overkill in that a user does not wish to quote every post. It may be the case that the user does not wish to quote any posts at all. The quote button effectively becomes clutter for any posts that are not being quoted. Further, the quote button functions only if a single reply form is opened. If more than one reply form is open at the time the quote button is activated, the function is unable to determine which open reply form is intended target for the quoted material.

A variation of the quote button concept places the quote button only within open reply forms. Here, the user locates the text to be quoted, selects the text, navigates back to the reply form, and activates the quote button. The selected text is automatically inserted into the reply form along with an indication of the source post. While this implementation reduces overall user interface pollution, it still introduces an added control, and therefore clutter, within the reply form that may or may not be used. Moreover, both implementations of the quote button, like the manual technique described above, lack the ability to preserve context of the markup language page from which the quoted material is taken.

It would be beneficial to provide a technique for quoting material in a discussion forum in a manner which overcomes the deficiencies described above.

SUMMARY OF THE INVENTION

The present invention provides method(s) and apparatus relating to discussion forums and the quoting of material from a post within a discussion forum. One embodiment of the present invention can include a method of quoting content from a post in a discussion forum. The method can include selecting content within a source post of the discussion forum and performing a drag operation wherein a representation of the selected content is dragged in coordination with motion of an onscreen pointer. The method further can include inserting the selected content within an open reply form in the discussion forum upon termination of the drag operation.

Another embodiment of the present invention can include a method of quoting content from a post in a discussion forum including identifying selected content within a source post of the discussion forum and dragging the selected content in coordination with motion of an onscreen pointer. A representation of the selected content can be continually displayed proximate to the pointer and be visually presented in semi-transparent format while being dragged. The method further can include creating markup language causing insertion of the selected content and one or more attributes of the source post within an open reply form if the pointer is located over the open reply form when dragging of the selected content terminates.

Yet another embodiment of the present invention can include a machine readable storage being programmed to cause a machine to perform the various steps and/or functions described herein.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
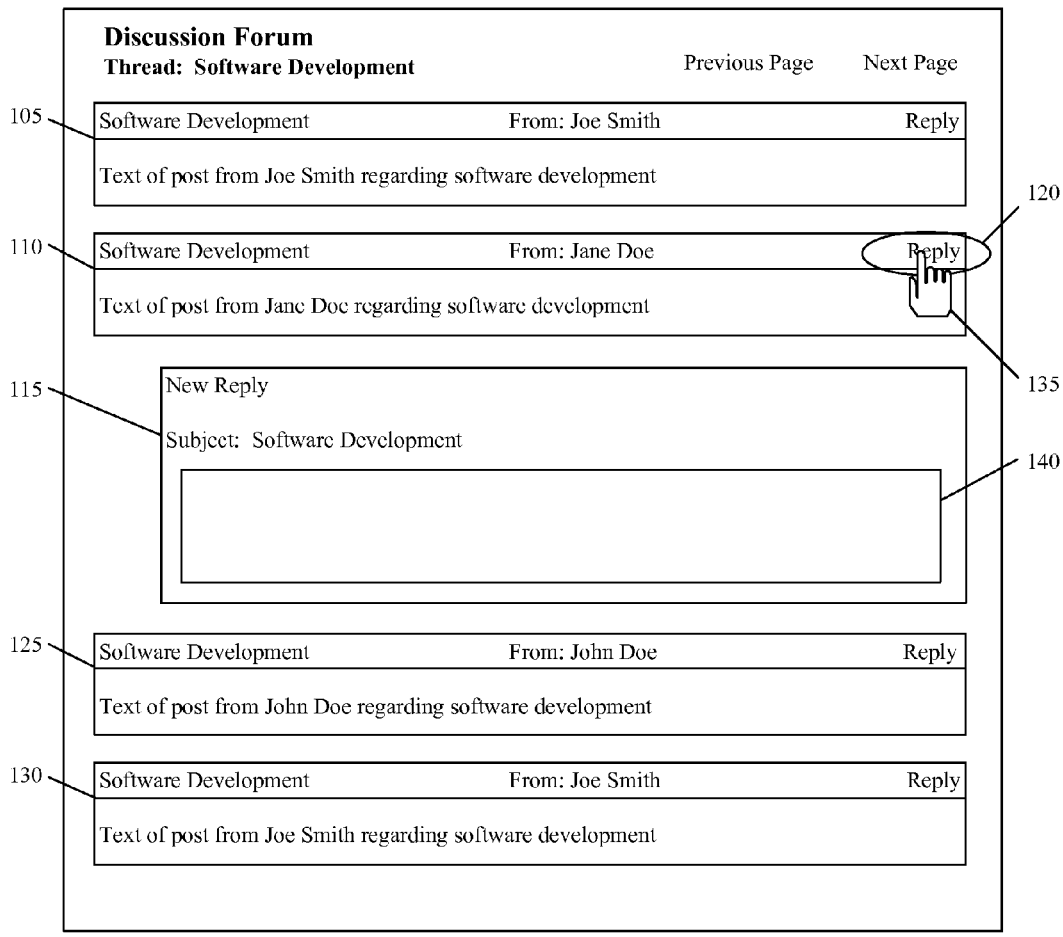
FIG. 1 depicts a view of a graphical user interface (GUI) for a discussion forum which is useful for understanding the embodiments disclosed herein.

FIG. 1 depicts a view 100 of a graphical user interface (GUI) for a discussion forum which is useful for understanding the embodiments disclosed herein. The view 100 can be rendered within a browser or other application. For example, the browser can navigate to a particular markup language document, which when loaded and executed within the browser, causes view 100 to be rendered, or visually presented, upon a display of a user information processing system. In any case, the view 100 presents a plurality of posts 105, 110, 125, and 130 of a particular discussion thread relating to "software development".

In this case, a reply form 115 has been opened and presented responsive to the selection of reply control 120 within post 110 by a pointer 135 or other control mechanism. The reply form 115 can include a subject line which can be auto-filled with the appropriate subject, i.e. one taken from the post to which the reply is being submitted, in this case post 110. As shown, the reply form 115 also can include a text box 140 which can receive content including, but not limited to, text, graphics, audio, video, audiovisual material, links to other content, and any other content that is to be part of the reply to post 110.

Figure 2:
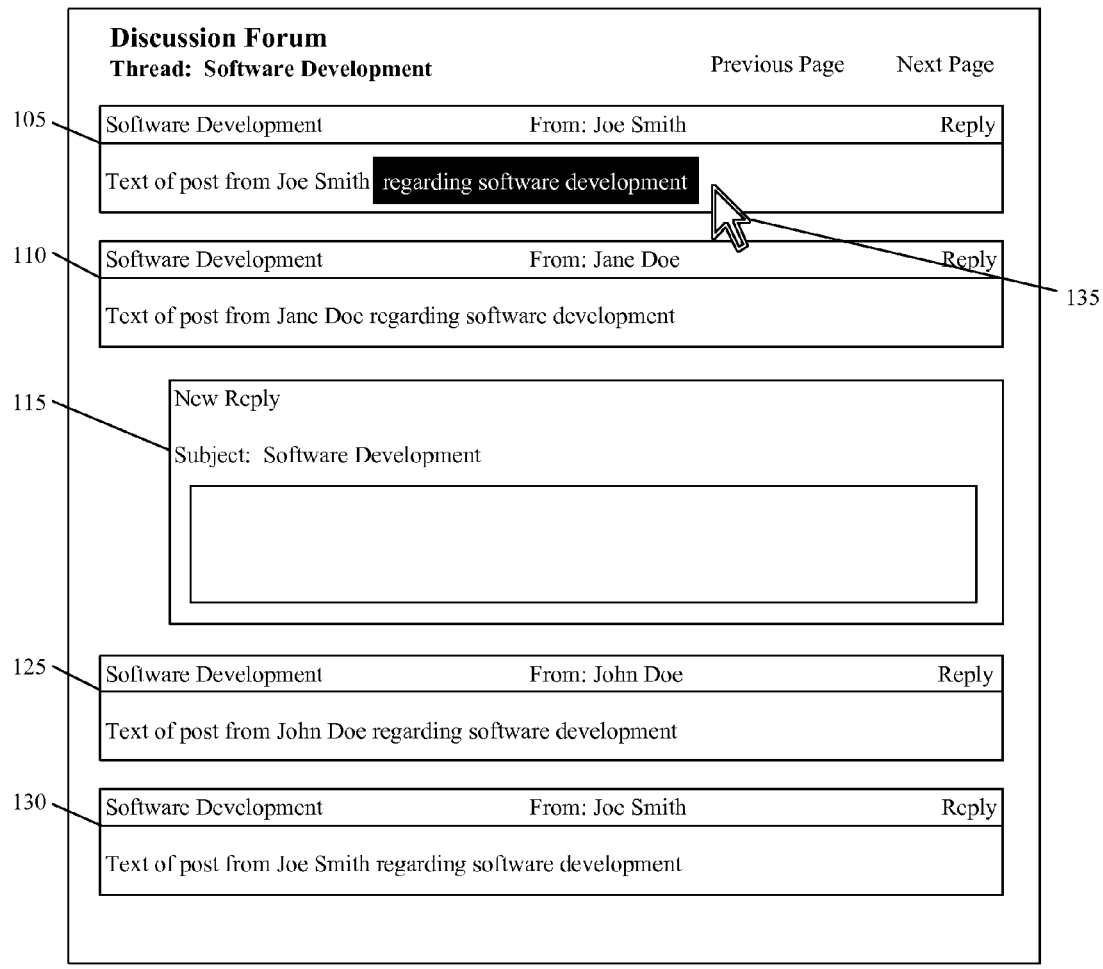
FIG. 2 depicts the view of FIG. 1 in accordance with another embodiment of the present invention.

FIG. 2 depicts the view of FIG. 1 in accordance with another embodiment of the present invention. More particularly, responsive to one or more user commands or inputs, content of the source post 105 can be selected by pointer 135. In this case, the selected content is the text "regarding software development". It should be appreciated that the post from which text is to be quoted, referred to as the source post, may be the post to which a reply is being authored or any other post within a given discussion thread. In this example, the source post 105, though located on the same page as the post 110 to which reply 115 is being created, is a different post than the post 110.

Figure 3:
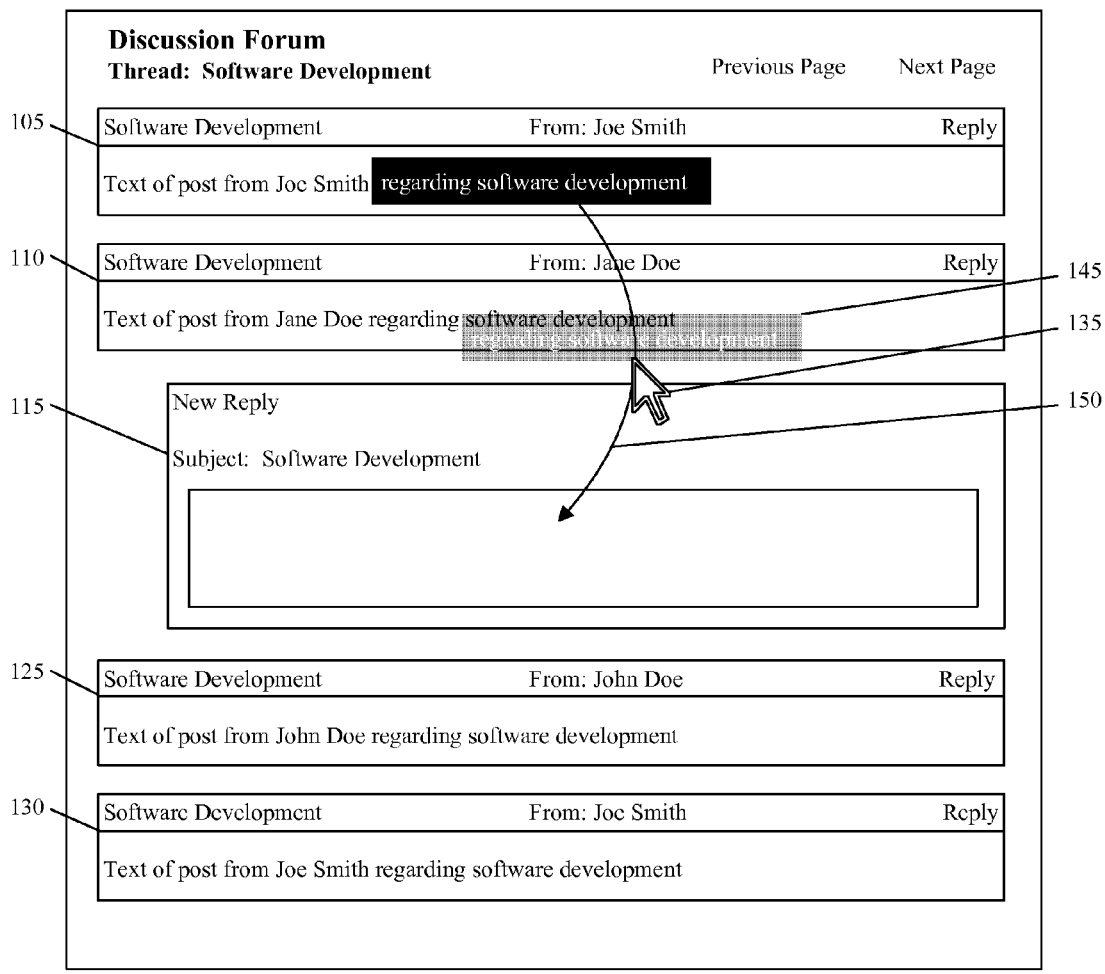
FIG. 3 depicts the view of FIG. 1 in accordance with another embodiment of the present invention.

FIG. 3 depicts the view of FIG. 1 in accordance with another embodiment of the present invention. As shown, after selecting the text "regarding software development" in source post 105, the user has initiated a drag operation. Typically, a user initiates a drag operation by selecting an object, in this case the selected text "regarding software development", and continuing to engage the selection mechanism, i.e. a mouse or other pointer button, as the pointer control is moved. As the user begins to move the pointer, the selected object, in this case the text from quote 105, can be dragged to a different onscreen location and manipulated or inserted into the target location, i.e. the location where the object is dropped and the drag operation is terminated.

In accordance with one embodiment of the present invention, a representation 145 of the selected content, in this case the text, can be displayed proximate to the pointer 135 as the drag operation continues. As shown, the pointer 135 is moved along path 150. As the pointer 135 moves along path 150, the representation 145 of the quoted text moves along path 150 with the pointer 135. In one embodiment, the representation 145 can, but need not, be made to appear semi-transparent and, as shown, specify the content that is being quoted. In the case where content other than text is being dragged, another visual identifier of the content, such as an icon, can be used as representation 145.

Figure 4:
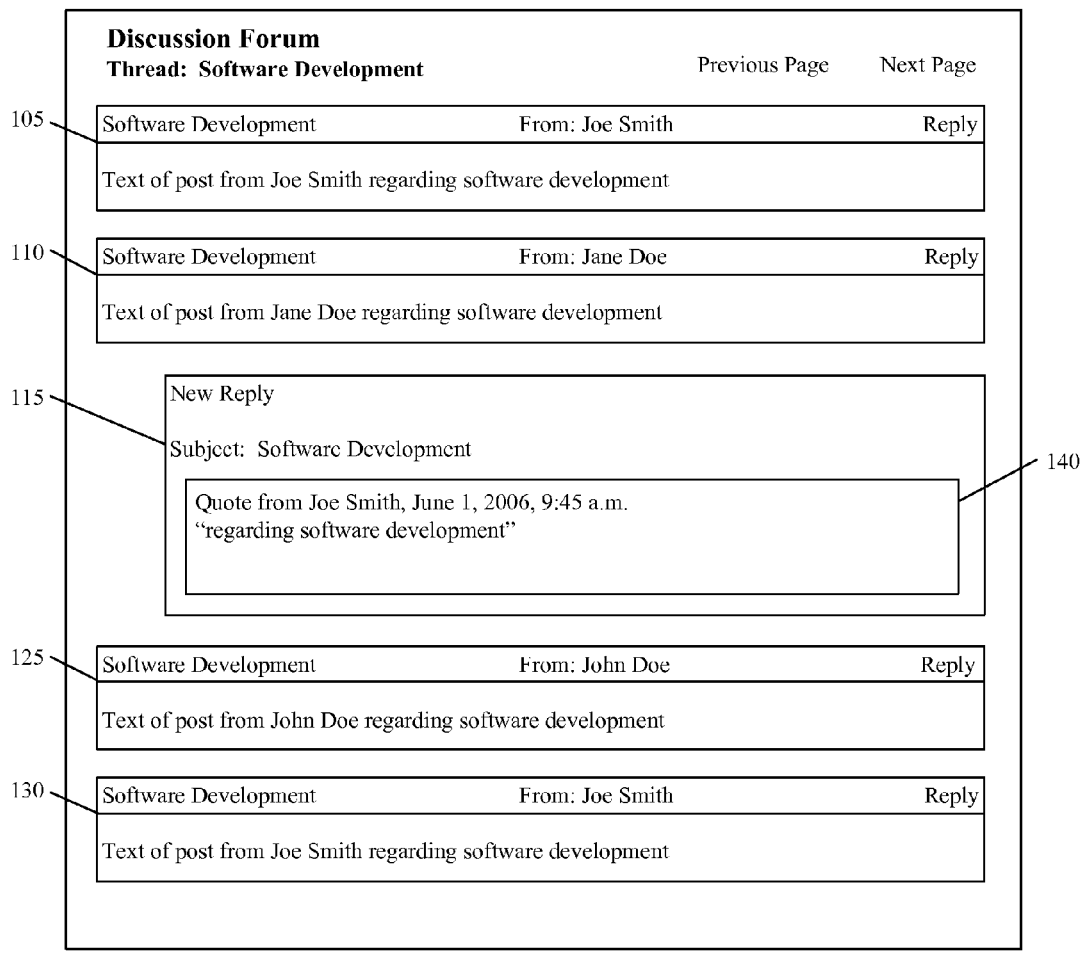
FIG. 4 depicts the view of FIG. 1 in accordance with another embodiment of the present invention.

FIG. 4 depicts the view of FIG. 1 in accordance with another embodiment of the present invention. More particularly, FIG. 4 illustrates the state of view 100 after the drag operation has terminated. In this case, the destination, or end point, of path 150 of FIG. 3 was the text box 140 of open reply form 115. Responsive to dropping the representation 145 of the quoted text over reply form 115, the selected content, in this case text, from source post 105 can be inserted into the text box 140. If the quoted content is other material, i.e. multimedia, audio, an image, or video, a link to that material can be provided in text box 140 as well as, or alternatively, an identifier such as an icon. If the icon is inserted, selection of the icon can execute a link to the content represented by the icon. In addition, information attributing the quoted text to source post 105 also can be inserted. In this case, the information can specify attributes which may include, but are not limited to, the author of the source post, the time of the source post, the date of the source post, as well as any other identifying information, including symbols, regarding the source post that may be desired.

In one embodiment, the various functions described herein can be programmed using JavaScript and Dynamic Hypertext Markup Language (DHTML). In general, markup language pages, including Web pages, that utilize technologies such as DHTML, HTML, JavaScript, and Cascading Style Sheets (CSS) can implement features such as drag-and-drop in a manner that is largely consistent with drag-and-drop desktop implementations. The posts of the discussion thread, for example, can be implemented such that each post is a separate section represented using containment HTML tags such as "DIV". The "DIV" tag can be dedicated to representing the reply form and can be implemented to parse the Document Object Model (DOM) of the browser to find the post from which the quoted text was taken.

Figure 5:
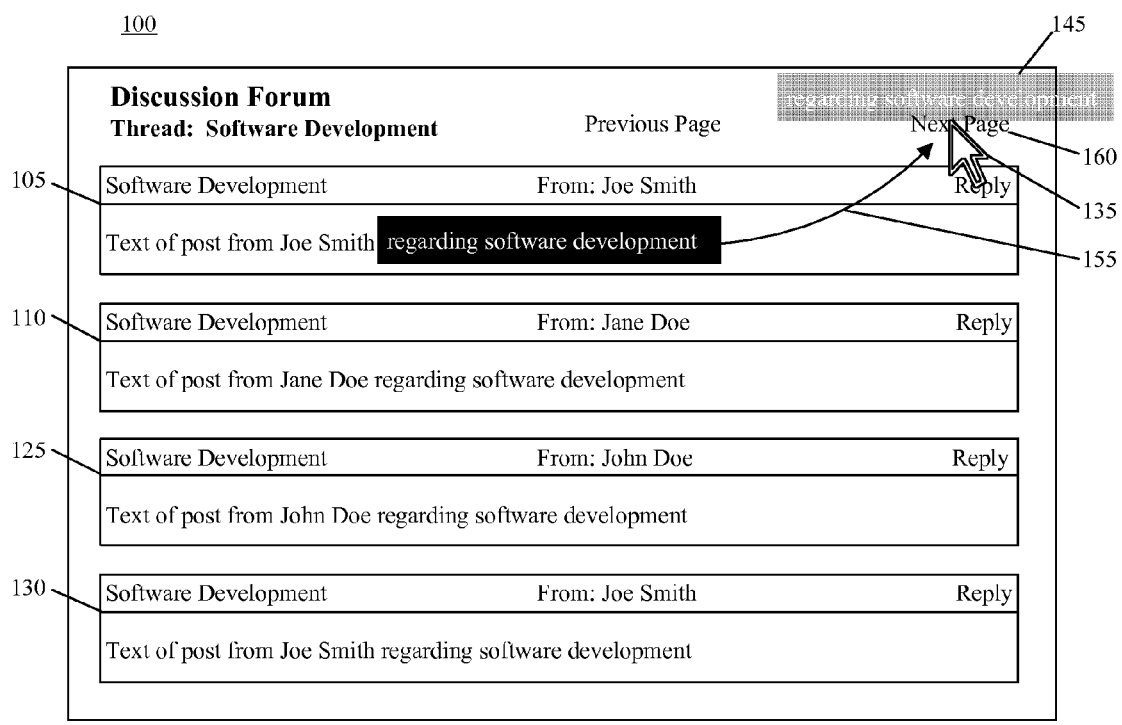
FIG. 5 depicts the view of FIG. 1 in accordance with another embodiment of the present invention.

FIG. 5 depicts the view of FIG. 1 in accordance with another embodiment of the present invention. In this embodiment, the target to which the quoted text is to be dropped, or inserted, is not located on the same page that contains the source post 105. As shown, the representation 145 of the quoted material can move with the pointer 135 as previously described. The user can move the pointer 135 along path 155 to any of a variety of different page navigation controls. In this case, the path 155 leads to a page navigation control 160 which is shown as the text "Next Page". The page navigation control 160 can cause a next page to be rendered in the user's browser that includes a next set, or plurality, of posts in the current discussion thread.

Responsive to a particular event or condition, the page navigation control 160 can be activated. In one embodiment, the page navigation control 160 can be activated after the pointer 135 has been located over the page navigation control 160 for a predetermined, minimum amount of time and a drag operation is still in process, or ongoing, during that period of time. Any of a variety of mechanisms can be provided to the user to allow page navigation control 160, or another Web navigational control for that matter, to be selected, or activated, during a drag operation. Accordingly, the invention is not intended to be limited only to those examples disclosed herein.

Figure 6:
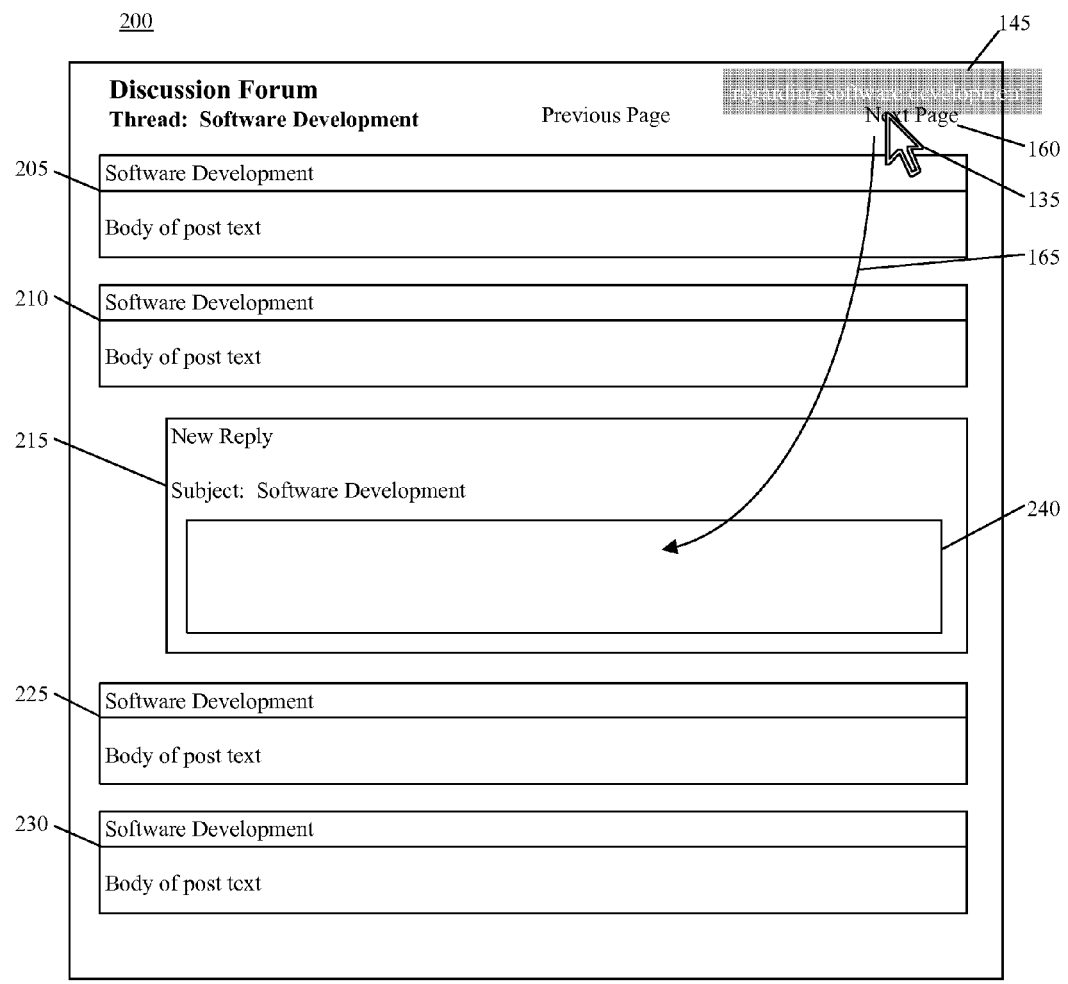
FIG. 6 depicts a view of the discussion forum which is useful for understanding the embodiments disclosed herein.

FIG. 6 depicts a view 200 which is useful for understanding the embodiments disclosed herein. View 200 can be rendered responsive to activation of the page navigation control 160 as discussed with reference to FIG. 5. Once the view 200, i.e. the new markup language page comprising different posts 205, 210, 225, and 230, is rendered, the drag operation can continue. Accordingly, as long as the drag operation has not been terminated, i.e. by the user releasing the selection mechanism, the representation 145 can remain proximate to the pointer 135 while traveling along user-directed path 165. The user can continue to move the pointer 135 along path 165 toward the destination, i.e. open reply form 215. The quoted content can be dropped into the open reply form 215 as previously described.

To implement a drag-and-drop operation across multiple markup language pages, state information must be maintained. In one embodiment of the present invention, when the drag operation is started, a request can be issued to store state information on the page server. This state information can indicate the context of the page that is displayed when the drag operation is started. As such, state information can specify which posts were displayed upon the screen at the time material was selected within the source post, which post is the source post, the material that is to be quoted from the source post, and the like. The state information can be maintained so long as the drag operation continues, i.e. until termination. Upon completion of the drag operation, i.e. dropping the quoted material into the open reply form, the server can be notified and the state information can be deleted or over-written.

By maintaining state information, if the drag operation is terminated prematurely or inadvertently by the user, the view of the page that was displayed when the user selected the text to be quoted from the source post can be displayed. In illustration, consider the state, or context, of view 100 of FIG. 2 in which the user begins the drag operation. The user can move the pointer over the page navigation control 160 to cause another page, i.e. view 200 of FIG. 6, to be displayed. If the drag operation is discontinued prior to the user dropping the content within the open reply form 215, i.e. due to the user becoming distracted and letting go of the pointer device, etc., the server can revert to the saved context and present view 100 of FIG. 2. Consequently, if the drag operation is terminated prior to a drop operation completing in an open reply form, the server can be directed to provide the page containing the source post in the same context in which the page was originally displayed when the user first selected the content for quoting. The content to be quoted can be presented normally or highlighted, i.e. selected, depending upon system preference. This prevents the user from having to search again for the source post in the event that the drag-and-drop operation did not complete as intended.

Figure 7:
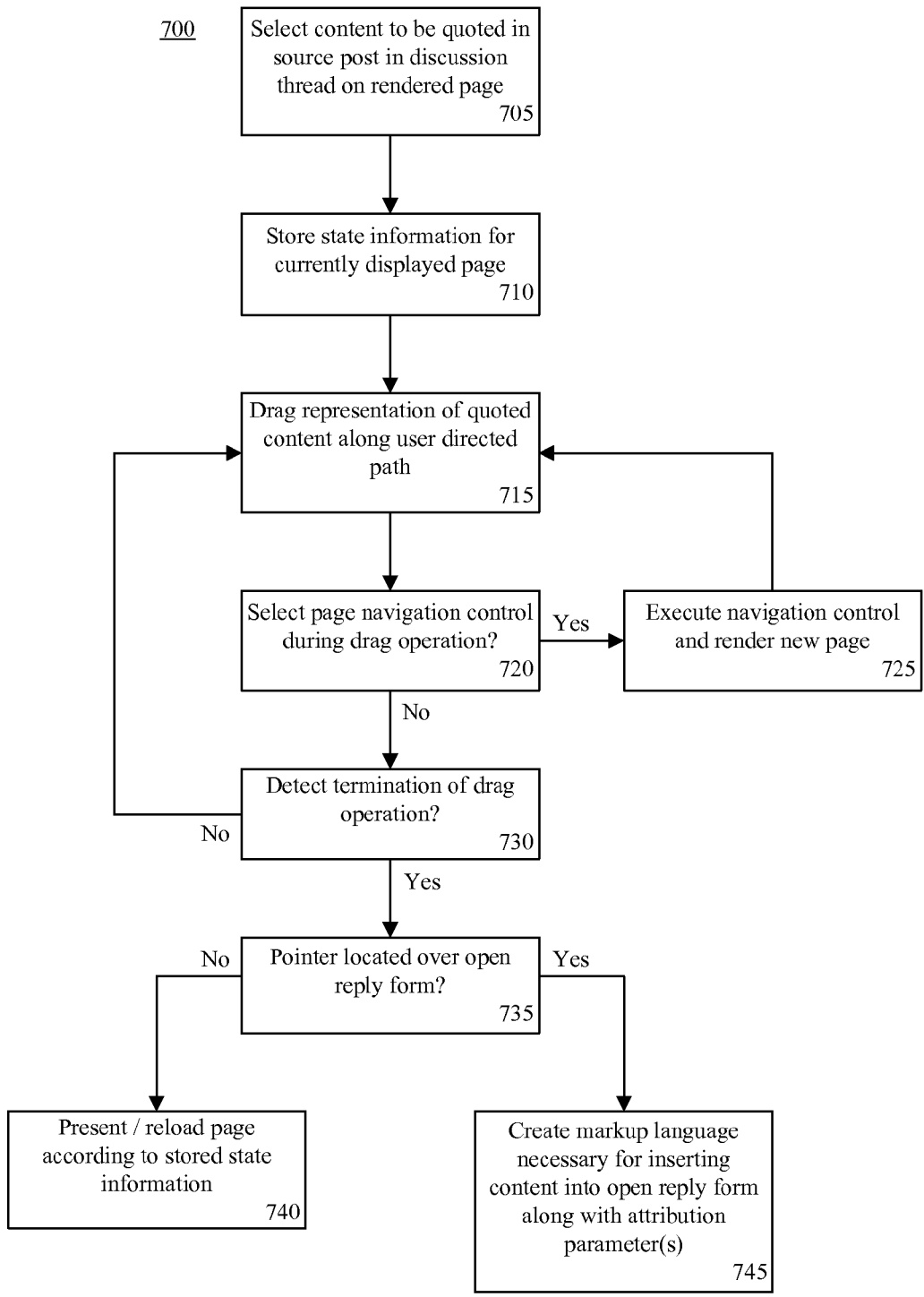
FIG. 7 is a flow chart illustrating a method of quoting content from a post of a discussion forum in accordance with yet another embodiment of the present invention.

FIG. 7 is a flow chart illustrating a method 700 of quoting content from a post of a discussion forum in accordance with yet another embodiment of the present invention. The method 700 can begin in a state in which a user has navigated to a discussion forum and is viewing a plurality of posts of a particular discussion thread. The posts, as discussed, can be presented within a markup language page that is rendered within a browser application executing within a user computer system.

Accordingly, in step 705, responsive to one or more user inputs, content from a source post can be selected. The selected content can be content that is displayed or otherwise available within the source post. The source post can be one of the plurality of posts of the discussion thread that is displayed within the rendered page.

In step 710, state information for the current page can be stored, for example on the server that is providing the discussion forum pages, another server, and/or on the information processing system of the user. In any case, the state information can indicate the current page being displayed as well as which posts are displayed in that page, i.e. the actual view shown in the user's browser. Additional state information can include identifying information for the post from which content was selected and the selected content itself. The state information can include any information necessary to reload the current page to its present state or context. In another embodiment, step 710 can be performed responsive to initiation of the drag operation rather than being performed following step 705.

In step 715, responsive to one or more user inputs, a drag operation of the quoted content can be initiated. As noted, a representation of the selected content can be dragged along a path that follows, or tracks, the motion of the onscreen pointer, which is under user control. The representation of the quoted content can be presented proximate, i.e. can be "pinned to", the onscreen pointer and presented in a semi-transparent manner if so desired. The representation of the quoted content can indicate to the user that the drag operation has been initiated.

In step 720, a determination can be made as to whether the user has selected a page navigation control during the drag operation. If so, the method can proceed to step 725, where the navigation control can be activated. In that case, the action associated with the activated navigation control can be performed. As noted, in one embodiment, a new or next page of posts for the discussion thread can be presented. The method then can loop back to step 715 to continue moving the representation of the selected content with the pointer along a user directed path as described herein.

In another embodiment, during the drag operation, if the pointer is moved to a location near an end or outer perimeter of the viewable area of the rendered page, instructions can be provided which cause the page to scroll in the direction indicated by the pointer. For example, if moved to the bottom of the viewable area, the page can be made to scroll down. If the pointer is located at the top portion of the viewable area, the page can be made to scroll up. Similarly, the page can be made to scroll left or right respectively if the pointer is moved to the left or right portion of the viewable area. This can be beneficial when the destination for the drag operation, i.e. the open form, is not included or displayed within the viewable portion of the page being displayed, but can be found through scrolling as opposed to opening a new markup language page.

If a page navigation control has not been selected during the drag operation, the method can proceed to step 730. In step 730, a determination can be made as to whether the drag operation is continuing or has terminated. If the drag operation has not been terminated, the method can loop back to step 715 to continue moving the representation of the selected content with the pointer along the user directed path. If, however, the drag operation has terminated, the method can proceed to step 735.

In step 735, a determination can be made as to whether the pointer is located over an open reply form. If so, the method can proceed to step 745. If not, the method can proceed to step 740. In step 740, the page that was originally presented that contained the source post can be presented. If no navigation control causing a different page to be displayed was activated while dragging the quoted content, reloading of the original page including the source post is not necessary as that page is still being displayed. In that case, the page can be made to scroll either up or down to the "DIV" tag corresponding to the source post. If a navigation control has been activated causing a different page to be displayed, the page including the source post can be reloaded. In any case, page can be presented according to the stored state information and, therefore, maintain the same context as when the content to be quoted was originally selected. Preserving the context prevents the user from having to relocate the source post in the event that the drag operation was unintentionally or willfully terminated. The user can begin from the same starting point, i.e. with the source post being displayed and the content that was originally selected for quoting still selected. After step 740, the method can repeat if so desired in accordance with user specified input.

If the pointer is located over an open reply form, in step 745, the selected content can be inserted into the open reply form. Any markup language needed for inserting the content as well as proper attribution of the source post can be created and/or included as well. Attribution parameters can include, but are not limited to, the author of the source post, the time stamp of the source post, the date of the source post, an identifier such as a number of the source post, etc.

The embodiments disclosed herein provide a technique for quickly and easily quoting content from a post of a discussion forum and including that content within a reply. By preserving the context in which the content was originally quoted, the user is spared from having to relocate the source post in the event that the drag operation is inadvertently terminated. It further should be appreciated that the embodiments disclosed herein can be used in cases where a plurality of open reply forms are open since the user specifies the particular open reply form to be used by having located the pointer over the intended reply form when the drag operation terminates.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language.

This invention can be embodied in other forms without departing from the spirit or essential attributes thereof. Accordingly, reference should be made to the following claims, rather than to the foregoing specification, as indicating the scope of the invention.

What is claimed is:

1. A method, comprising:
   selecting content within a source post of a first page of a discussion forum provided by a server;
   performing a drag operation of the selected content;
   responsive to the drag operation, storing, within the server, a state of the first page of the discussion forum comprising the source post, wherein the state specifies which portions of the first page are visible; and
   during the drag operation, loading and displaying at least a second page of the discussion forum responsive to a user selection of a page navigation control during the drag operation.

2. The method of claim 1, further comprising:
   responsive to the drag operation terminating with the onscreen pointer not located over an open reply form of the discussion forum, reloading the first page, recalling the state of the first page of the discussion forum from the server, and changing a view to display the first page in the recalled state.

3. The method of claim 1, further comprising:
   responsive to the drag operation terminating with the onscreen pointer located over an open reply form on the at least a second page of the discussion forum, inserting a copy of the selected content within the open reply form in the discussion forum upon termination of the drag operation.

4. The method of claim 3, wherein inserting the selected content further comprises determining that the onscreen pointer is located over the open reply form.

5. The method of claim 3, wherein inserting further comprises:
   identifying at least one attribute of the source post; and
   creating markup language causing insertion of a copy of the selected content and a copy of the at least one attribute of the source post into the open reply form.

6. The method of claim 1, wherein selection of the page navigation control causes a different page than is currently displayed to be loaded.

7. The method of claim 1, wherein during the drag operation, loading at least a second page of the discussion forum responsive to a user selection of a page navigation control further comprises dynamically scrolling the page in at least one direction according to a location of the onscreen pointer.

8. The method of claim 1, wherein performing a drag operation further comprises:
while the drag operation is in progress, detecting that the onscreen pointer is located over the page navigation control for loading a different page than is currently displayed;
activating the page navigation control while the drag operation is in progress; and
rendering the at least a second page while the drag operation is in progress.

9. The method of claim 2, wherein recalling the state of the first page of the discussion forum from the server and changing the view to display the first page in the recalled state further comprises the server rendering the first page of the discussion forum comprising the source post in the recalled state.

10. The method of claim 1, wherein a user selection of the page navigation control comprises a determination that the onscreen pointer has been located over the page navigation control for at least a minimum amount of time.

11. A method, comprising:
identifying selected content within a source post of the discussion forum;
dragging the selected content in coordination with motion of an onscreen pointer;
responsive to detecting the drag operation, storing, within a server that renders pages of the discussion forum, a state of a view of the discussion forum, wherein the state of the view specifies a page of the discussion forum displayed when the drag operation is initiated and which portions of the page are visible; and
selectively recalling the state of the view of the discussion forum from the server responsive to the drag operation terminating and according to a location of the onscreen pointer.

12. The method of claim 11, further comprising:
recalling the state of the view of the discussion forum from the server responsive to determining that the pointer is not located over an open reply form of the discussion forum, and presenting the page of the discussion forum according to the recalled state.

13. The method of claim 11, further comprising:
creating markup language causing insertion of a copy of the selected content and a copy of at least one attribute of the source post within an open reply form responsive to determining that the onscreen pointer is located over the open reply form when the dragging of the selected content terminates.

14. The method of claim 11, wherein dragging further comprises:
while dragging the selected content, detecting that the onscreen pointer is located over a page navigation control for loading a different page than is currently displayed;
activating the page navigation control while dragging the selected content; and
rendering the different page while dragging the selected content.

15. A machine readable storage device having stored thereon program code executable by a computer to perform:
selecting content within a source post of a first page of a discussion forum provided by a server;
performing a drag operation of the selected content;
responsive to the drag operation, storing, within the server, a state of the first page of the discussion forum comprising the source post, wherein the state specifies which portions of the first page are visible; and
during the drag operation, loading and displaying at least a second page of the discussion forum responsive to a user selection of a page navigation control during the drag operation, wherein
the machine readable storage device does not consist of a transitory, propagating signal.

16. The machine readable storage device of claim 15, wherein the method further comprises:
responsive to the drag operation terminating with the onscreen pointer not located over an open reply form of the discussion forum, reloading the first page, recalling the state of the first page of the discussion forum from the server, and changing a view to display the first page in the recalled state.

17. The machine readable storage device of claim 15, wherein the method further comprises:
responsive to the drag operation terminating with the onscreen pointer located over an open reply form on the at least a second page of the discussion forum, inserting a copy of the selected content within the open reply form in the discussion forum upon termination of the drag operation.

18. The machine readable storage device of claim 17, wherein inserting further comprises:
identifying at least one attribute of the source post; and
creating markup language causing insertion of a copy of the selected content and a copy of the at least one attribute of the source post into the open reply form.

19. The machine readable storage device of claim 15, wherein a user selection of the page navigation control comprises a determination that the onscreen pointer has been located over the page navigation control for at least a minimum amount of time.

20. The machine readable storage device of claim 15, wherein performing a drag operation further comprises:
while the drag operation is in progress, detecting that the onscreen pointer is located over the page navigation control for loading a different page than is currently displayed;
activating the page navigation control while the drag operation is in progress; and
rendering the at least a second page while the drag operation is in progress.

* * * * *